Patented Sept. 2, 1952

2,609,349

UNITED STATES PATENT OFFICE 2,609,349

RESINOUS COMPOSITIONS OF STYRENE, CASTOR OIL, AND A DIISOCYANATE

William E. Cass, Schenectady, N. Y., assignor to General Electric Company, a corporation of New York No Drawing. Application February 4, 1950, Serial No. 142,539

24 Claims. (Cl. 260—23)

This invention is concerned with resinous compositions comprising castor oil, an organic diisocyanate, and styrene. More particularly, the invention relates to a composition of matter comprising (a) styrene, (b) castor oil, both in the hydrogenated and raw unhydrogenated form, and (c) an organic compound containing two —NCO groups. The invention embraces both liquid, soluble, fusible products as well as solid, non-fusible, insoluble compositions prepared from the soluble, fusible materials. For purposes of brevity, the term "castor oil" will be used hereinafter in the specification and in the appended claims to designate both the hydrogenated and unhydrogenated forms.

U. S. 2,358,475, issued September 19, 1944, discloses varnishes comprising modified drying oils obtained by reacting the oils with a diisocyanate. This patent also includes disclosures that various synthetic resins such as polystyrene, polyvinyl chloride, etc., may be added after the diisocyanate modifier has reacted with the oils in question. My invention differs from that disclosed in the aforementioned patent in that instead of using synthetic resins with the varnishes obtained from the drying oils and the isocyanates, I employ monomeric styrene rather than polymeric styrene. In addition, I do not precondense the styrene with the drying oil prior to modification with the diisocyanate, but rather interact the castor oil with the diisocyanate in the presence of the styrene. This latter distinction is an important one since my invention yields entirely different products than those obtained when the styrene is intercondensed with the drying oil and thereafter modified with a diisocyanate in accordance with the teachings of the aforementioned patent.

The products obtained in accordance with my invention have unique properties which make them suitable for such applications as molding, casting, and laminating in the plastics field. Unexpectedly, it was found that of all the monomeric materials available, only styrene was able to give these unique, highly desirable properties. It was found that when other monomeric materials such as, for instance, methyl methacrylate, vinyl acetate, diallyl phthalate, etc., were employed in place of the styrene, the resulting compositions when cured to the substantially infusible, insoluble form were cheesy weak gels, which was in strong contrast to the properties of the styrene-modified materials which were strong, insoluble, tough materials.

In accordance with one of the embodiments of my invention, castor oil and a diisocyanate (for example, one corresponding to a general formula OCN—R—NCO, where R is a divalent organic radical, for example, alkylene, arylene, alkarylene, aralkylene, etc., as well as other or similar divalent organic radicals containing substituents thereon which are non-reactive with the diisocyanate, styrene, or castor oil) are mixed together in the proper proportions and heated to obtain a soluble resin. This resin can be dissolved in monomeric styrene to form a varnish. Alternatively, all three ingredients may be mixed simultaneously and the heating omitted to form a varnish. In many cases heating of the castor oil-diisocyanate mixture is not necessary since the mere addition of the diisocyanate results in an exothermic reaction which may cause linking of the castor oil molecules. Thereafter in many applications, additional diisocyanate (in an amount necessary to effect cross-linking of the resin) as well as a vinyl polymerization catalyst for the styrene may be added to the aforementioned varnish and this latter mixture preferably heated until a solid, infusible, tough material is obtained. Prior to the latter heat treatment, the mixture of ingredients may be cast in various molds or may be employed to impregnate various fillers such as glass fibers, asbestos fibers, titanium dioxide, cellulosic fillers (such as wood flour), cloth cuttings, etc., and this mixture molded under heat and pressure to give useful objects. Alternatively, the varnish with the additional amount of diisocyanate and the vinyl polymerization catalyst may be employed to coat and impregnate various sheet materials used in the laminating art, the impregnated sheets superposed upon each other and molded under heat and pressure to give useful laminated panels.

In preparing the initial varnish comprising the styrene, the castor oil, and the diisocyanate, the ratio of ingredients employed in this mixture may be varied depending upon the properties desired in the final product. In general, the styrene is preferably present in an amount ranging from 1 to 99% of the total weight of the three ingredients. Preferably the styrene comprises from 10 to 75%, by weight, of the total weight of the castor oil, styrene and diisocyanate.

The amount of castor oil and diisocyanate employed may also be varied without departing from the scope of the invention. Thus, the castor oil may comprise from 5 to 95% of the total weight of the three ingredients, preferably from 25 to 75% of the total weight of the styrene, castor oil, and diisocyanate. In general, the use of increasingly larger amounts of styrene in the reaction mixture tends to give harder and less flexible products.

In calculating the amount of diisocyanate which may be employed in the practice of my invention, in most instances, it is essential to consider the particular diisocyanate employed as well as the type of product desired. Generally, the diisocyanate is advantageously present in a molar ratio ranging up to 2 mols of the diisocyanate per mol of the castor oil. In order to prepare the liquid, fusible, non-gelled product, it is desirable that the molar ratio be equal to at most 1 mol of the diisocyanate per mol of the castor oil, e. g., from 0.1 to 1 mol of the diisocyanate per mol of the castor oil. To obtain insoluble, infusible products it is advisable that the diisocyanate be present in a molar ratio equal to more than 1 but less than 2 mols of the diisocyanate per mol of castor oil in the mixture of ingredients; the preferred range in such a case being about 1.01–1.5 mols of the diisocyanate per mol castor oil. It will of course be apparent to those skilled in the art that smaller or larger ratios of diisocyanate and castor oil may be employed without departing from the scope of the invention. In general, the molar ratios used in a particular instance will depend upon such factors, as for example, the kind of diisocyanate employed, whether the hydrogenated or non-hydrogenated castor oil is used, the properties desired, etc. It has been found in many applications that the usual preferred ratio is slightly more than 1 mol of the diisocyanate per mol of the castor oil in order to obtain soft products, and above 1 up to and including 1.5 mols of the diisocyanate per mol of the castor oil to obtain firmer products. The use of more than 2 mols diisocyanate per mol castor oil yields again fusible, soluble products and in order to obtain solid, infusible, insoluble products additional amounts of castor oil are required.

In calculating the molar ratio of diisocyanate to castor oil it will be apparent that the molecular and equivalent weight of the castor oil should be taken into consideration. As is known, castor oil comprises essentially glycerol triricinoleate. If castor oil were the glycerol ester entirely, its molecular weight would be 932 and its equivalent weight 311 (hydroxyl basis). However, castor oil because of the presence of smaller amounts of other fatty materials has an average acetyl value of 148. This latter average corresponds to an equivalent weight of 379 (on hydroxyl basis) or an apparent molecular weight of 1135. It is this latter value of 1135 which has been used in the succeeding examples for calculating ratios of castor oil to diisocyanates in making the various varnishes or solid products with styrene. For many purposes, on a weight basis, good results are obtained when the diisocyanate comprises from 1 to 15%, based on the weight of the castor oil in order to obtain liquid, fusible products and from 15 to 30% of the diisocyanate based on the weight of the castor oil in order to obtain solid, infusible, insoluble products. In the case of hexamethylenediisocyanate, I have found it advantageous to use from 15 to 23%, by weight, of the latter based on the weight of the castor oil.

In making the varnishes from styrene, castor oil and the diisocyanate, it is desirable and in many instances essential that no vinyl polymerization catalyst be employed at the start. However, in order to obtain the tough, solid products described above, it is essential that after preparation of the varnish from the styrene, castor oil and diisocyanate, there be added a vinyl polymerization catalyst together with an additional amount of diisocyanate which may be necessary to complete conversion of the liquid product to the solid, infusible, insoluble state.

The amount of vinyl polymerization catalyst employed may, of course, be varied within wide limits, for example, from 0.01 to 4.0% by weight or higher, preferably from 0.1 to 2.0% by weight, based on the weight of the styrene. It will of course be understood that any one or more of the well-known vinyl polymerization catalysts suitable for effecting polymerization of the styrene may be employed. Among these may be mentioned, for example, benzoyl peroxide, diacetyl peroxide, benzoyl acetyl peroxide, tertiary butyl peroxide, tertiary butyl hydroperoxide-1, ditertiary butyl perphthalate, 2-azo-bis-isobutyronitrile etc. Good results have been obtained when benzoyl peroxide is employed as the vinyl polymerization catalyst although it is to be understood that any other well-known vinyl polymerization catalyst may be employed without departing from the scope of the invention.

As pointed out previously, the diisocyanates employed in the practice of the instant invention are those corresponding to the general formula OCN—R—NCO, where R has the meaning given above. Among such diisocyanates may be mentioned ethylene diisocyanate, decamethylene diisocyanate, hexamethylene diisocyanate, propylene 1,2-diisocyanate, tetramethylene diisocyanate, butylene 1,3-diisocyanate, ethylidene diisocyanate, cyclopentylene 1,3-diisocyanate, cyclohexylene 1,3-diisocyanate, 1-methylphenylene 2,4-diisocyanate, diphenyl 4,4'-diisocyanate, p-isocyanato benzyl isocyanate, etc. Other diisocyanates containing substituents which are essentially inert to any of the reactants in the mixture of ingredients may be employed without departing from the scope of the invention. If desired, corresponding diisothiocyanates may also be used.

In preparing the varnishes coming within the scope of my invention, one method comprises mixing the castor oil and the diisocyanate, the latter being present in an amount insufficient to effect gelation of the castor oil, and the mixture preferably heated at a temperature ranging from slightly above room temperature to around 150° C., for example, from 40°–100° C. Although reaction may take place at room temperature due to the exothermic characteristic of the reaction, nevertheless, for many pratical purposes the application of heat is desirable. Thereafter, the styrene, preferably at room temperature, is incorporated with the resin to form a varnish. If it is desired to obtain solid, infusible, insoluble materials, the varnish or liquid, soluble composition described immediately preceding is then mixed with an adequate amount of vinyl polymerization catalyst for the styrene and with an additional amount of a diisocyanate sufficient to cause cross-linking of the castor oil. The castor oil used is preferably substantially free of water and may comprise raw castor oil or hydrogenated castor oil.

Another method for making the claimed compositions of matter coming within the scope of my invention comprises forming a mixture of ingredients containing the styrene, castor oil, an amount of diisocyanate sufficient to effect curing or cross-linking of the castor oil, and a small amount of a vinyl polymerization catalyst. Heating of this mixture at temperatures above room temperature accelerates the conversion of this mixture to the solid, tough, flexible, infusible, insoluble state.

It has been found advantageous in instances where the styrene, castor oil, diisocyanate and vinyl polymerization catalyst were intended to be converted in situ to the solid, infusible, insoluble state, as for instance, in casting applications, to degas the mixture, i. e., to remove any trapped air, or any liberated carbon dioxide, by placing the mixture of ingredients under a vacuum for a period of time ranging, for instance, from about 10 to 30 minutes after mixing while preferably agitating the mixture. By this simple process, it is possible to obtain clear bubble-free converted products.

In order that those skilled in the art may better understand how the present invention may be practiced, the following examples are given by way of illustration and not by way of limitation. All parts are by weight.

Example 1

About 93 parts non-hydrogenated castor oil and 22 parts hexamethylene diisocyanate were mixed together and degassed. To the resulting solution was added 50 parts monomeric styrene containing 1%, by weight, benzoyl peroxide. The resulting mixture was heated for 24 hours at 80° C. and an additional 24 hours at 100° C. The resulting polymer was white, opaque, somewhat rubbery and very tough. It swelled but did not dissolve in a mixture of toluene and acetone and showed no evidence of plastic flow when heated for 24 hours at 150° C. The product thus obtained was much harder and tougher than that obtained by heating a mixture of ingredients similar to that described above with the exception that the styrene and benzoyl peroxide were omitted.

Example 2

In this example, two additional samples were prepared in which the same ingredients were employed as in Example 1 except that in one sample 100 parts styrene and in the other sample 150 parts styrene, each containing 1%, by weight, benzoyl peroxide, were substituted for the 50 parts of styrene employed in the aforementioned Example 1. The mixtures were heated in the same manner to yield polymers whose hardness and toughness increased with the increasing styrene content.

Example 3

In this example 93 parts non-hydrogenated castor oil and 23 parts toluene diisocyanate were thoroughly mixed together and degassed. Thereafter 50 parts monomeric styrene, containing 1%, by weight, benzoyl peroxide, was added to the mixture and this solution was heated for 24 hours at 80° C. and for an additional 24 hours at 100° C. to obtain a polymer which was more translucent, harder and tougher than the polymers obtained in Examples 1 and 2 using hexamethylene diisocyanate.

When methyl methacrylate (plus 1% benzoyl peroxide) in an equal amount was substituted for the styrene in the mixture of ingredients described in Example 3 and the solution heated about 15 hours at 80° C., 4 hours at 100° C. and 2 hours at 125° C. there was obtained a weak gel which was much less tough than was obtained in the case of monomeric styrene.

Example 4

This example illustrates the effect of using polystyrene in place of monomeric styrene with the above identified ingredients. More particularly, it was found that it was impossible to incorporate polystyrene in the castor oil-diisocyanate system without the use of a mutual solvent due to the insolubility of the polystyrene in such a system. When a mutual solvent was employed, however, it had to be present in a considerable amount. Thus, when 20 parts non-hydrogenated castor oil was added to a solution of 5 parts polystyrene in 20 parts benzene, most of the polystyrene precipitated. By using 5 parts polystyrene, 5 parts castor oil and 1.2 parts toluene diisocyanate in 50 parts benzene, there was finally obtained a system which at least initially appeared to be homogeneous. A sample of this solution was poured on a glass surface and also cast in a small beaker and each of the samples heated at a temperature of about 80° C. for 18 hours. At the end of this time both the film sample on the glass plate and the cast sample were whitish resinous materials. However, physically they were much weaker and much less flexible than a castor oil-diisocyanate-styrene polymer prepared in essentially the same ratio of ingredients but omitting the polystyrene and instead using monomeric styrene plus a vinyl polymerization catalyst which was disclosed above in Example 3. The sample prepared with the polystyrene had such poor physical properties that it appeared useless for any practical application.

The attempt to use other polymerizable monomers in my system in place of styrene such as, for example, vinyl acetate, butyl methacrylate, ethyl acrylate and diallyl phthalate resulted in products which also were very weak and cheesy and appeared to be practically useless.

The following example illustrates the preparation of stable, solventless varnishes which can be prepared by employing an amount of diisocyanate insufficient to cause gelation of the mixture of ingredients. Subsequent addition of an organic diisocyanate and vinyl polymerization catalyst caused conversion of the ingredients to the insoluble, infusible state.

Example 5

In this example 16.8 parts hexamethylene diisocyanate was mixed with 113.5 parts non-hydrogenated castor oil and heated at 100° C. for 3 hours. The resulting composition was cooled, dissolved in an equal weight of monomeric styrene (containing quinone as a polymerization inhibitor) and degassed. A varnish stable at room temperature for at least a month was obtained. When 0.5%, by weight, benzoyl peroxide and 2.6%, by weight, hexamethylene diisocyanate (each being based on the weight of the varnish) was added to the varnish and the resultant mixture heated for 2 hours at 80° C. and 16 hours at 100° C., a white, flexible, tough resin was obtained.

Similar products were obtained as in Example 5 when either 1.9% or 3.1% hexamethylene diisocyanate was substituted for the 2.6%, by weight, hexamethylene diisocyanate employed in Example 5 (using the same amount, 0.5%, by weight, benzoyl peroxide). At the lower concentration of hexamethylene diisocyanate, i. e., 1.9%, the product was softer and more flexible while at the higher concentration of the diisocyanate (3.1%) the product was harder and tougher than that obtained in Example 5.

When the polymer obtained in Example 5 above was subjected to temperatures ranging from 100–150° C. for extended periods of time, it was found that the toughness and rubbery and flexible properties remained even at these temperatures. This is in contrast to the usual rubbery polyesters casting resins which tend to become cheesy as the temperature is raised.

Example 6

A disk was prepared by casting a mixture of ingredients comprising the stable varnish obtained in Example 5 and 3%, by weight, thereof hexamethylene diisocyanate and 0.5%, by weight, thereof benzoyl peroxide. The sample was heated for 20 hours at 80° C. and 70 hours at 100° C. During all this time the loss in weight was only 0.8%. The dielectric properties measured at 1000 cycles at room temperature were as follows:

Dielectric constant=5.31
Loss factor=0.0946
Power factor=0.018

Example 7

Another stable varnish was prepared by forming a mixture of ingredients comprising 17.4 parts toluene diisocyanate and 113.5 parts non-hydrogenated castor oil and heating this mixture for 3 hours at 100° C. The resulting liquid composition was mixed with an equal weight of styrene and degassed. When 0.5% benzoyl peroxide and 2.6% toluene diisocyanate, each being based on the weight of the aforementioned varnish, were added to this varnish and the resulting mixture heated for 2 hours at 80° C. and 16 hours at 100° C., an almost white, semi-translucent, tough, flexible polymer was obtained. With smaller amounts of toluene diisocyanate (for example, 1.95%) softer products were obtained. With larger amounts of toluene diisocyanate (for example, 3.2%) the products were tougher and harder. In general, it was found that the products using toluene diisocyanate were similar to the products employing hexamethylene diisocyanate with the exception that the former products were more translucent, somewhat tougher, and gelled much more rapidly. Products obtained by using hexamethylene diisocyanate to harden the stable varnish made with toluene diisocyanate and vice versa had properties which were practically the same as though the same diisocyanate had been used throughout.

Example 8

In this example 114 parts hydrogenated castor oil was heated with 15.5 parts toluene diisocyanate at 100° C. for about 1 hour. After cooling to about 50° C. an equal amount, by weight, of styrene was added to the mixture. Then 0.5% benzoyl peroxide and 2.7% toluene diisocyanate were added, the latter two ingredients being calculated on the weight of the varnish. This latter mixture was heated for two hours at 80° C. and about 15 hours at 100° C. to give a solid, infusible, insoluble, flexible, tough product which was translucent and harder than a similar product made with non-hydrogenated castor oil. It was very tough and retained the toughness even at 100° C. When 67%, by weight, styrene was employed instead of 50%, by weight, used above and otherwise the same mixture of ingredients used, a harder resin of exceptional toughness resulted.

Example 9

In this example the same ingredients and procedure was employed as in Example 8 with the exception that an equimolar amount of hexamethylene diisocyanate was employed in place of the toluene diisocyanate used in Example 8. In general, the products obtained in these instances were more waxy and harder although they still had the same toughness and flexibility as those resulting from the use of toluene diisocyanate.

The styrene-diisocyanate-hydrogenated castor oil products were harder and in general tougher than the resins based on the non-hydrogenated castor oil, and had the additional advantage of having better heat resistance. Thus, a sample of the material prepared in Example 8, when heated for about 98 hours at 150° C., turned light brown in color but still retained most of its original strength and flexibility.

The nature of the cross-linking reaction in the castor oil-diisocyanate-styrene system is critical as illustrated by the following Examples 10, 11 and 12.

Example 10

About 0.5%, by weight, benzoyl peroxide based on the weight of the hexamethylene diisocyanate-castor oil-styrene varnish described in Example 5 above was aded to the latter varnish without further addition of diisocyanate and the resulting mixture heated for 20 hours at 80° C. to give a white, sticky, viscous fluid. This indicated that without additional amounts of diisocyanate to cross-link the castor oil system, the properties of this product were quite different from those ordinarily obtained.

Example 11

Example 10 was repeated with the exception that 5%, by weight, pentamethylene 1,5-dimethacrylate based on the weight of the varnish mixture was also added to the initial varnish. Heating of this composition for the time stipulated in Example 10 gave a cross-linked gel which was white and fairly hard. However, this polymer was weak and cheesy and lacking in the toughness and rubberyness of my castor oil-diisocyanate-styrene products.

Example 12

To 10 parts of the hexamethylene diisocyanate-hydrogenated castor oil-styrene varnish prepared in Example 5 was added 0.05 part benzoyl peroxide, 0.25 part hexamethylene diisocyanate and 0.5 part pentamethylene 1,5-dimethacrylate. The resultant mixture was heated for 17 hours at 80° C. The resulting polymer was harder but less tough than a similar polymer prepared the same as above but omitting the pentamethylene dimethacrylate.

Examples 10, 11 and 12 illustrate that the amount of diisocyanate must be sufficient to cause gelation of the castor oil, that gelation of the styrene portion (but not the castor oil portion) with an active di-ethylenic monomer, (e. g., pentamethylene dimethacrylate) gives a distinctly inferior product and that even when the amount of diisocyanate is sufficient to cause gelation in the castor oil portion, the addition of an active di-ethylenic monomer results in a product which is not as tough as when the di-ethylenic monomer is omitted.

As pointed out previously, my compositions of matter have utility in casting, molding and laminating applications. Generaly, the insoluble, infusible products obtained in accordance with my invention are soft and rubbery and have a Shore Hardness ranging from about 5 to 100 at room temperature. Even the softer, more flexible products do not dissolve but merely swell in such strong solvent systems as acetone-toluene. Because of these properties my compositions of matter are particularly useful as potting compounds for electrical equipment such as coils, resistors, capacitors, etc.; as solventless varnishes for the impregnation of electrical equipment; as material for use in printing rolls; as room-temperature setting adhesives for rubber, etc.; in vibration damping systems, etc.

What I claim as new and desire to secure by Letters Patent of the United States is:

1. A composition of matter comprising (1) castor oil, (2) styrene and (3) an organic diisocyanate.

2. A composition of matter comprising (1) castor oil, (2) styrene, (3) an organic diisocyanate and (4) a vinyl polymerization catalyst for the styrene.

3. A composition of matter comprising the product of reaction of a mixture of ingredients comprising (1) castor oil, (2) styrene and (3) an organic diisocyanate.

4. A composition of matter comprising (1) styrene and (2) the product of reaction of a mixture of ingredients comprising (a) castor oil and (b) an organic diisocyanate.

5. A composition of matter comprising (1) styrene, (2) a vinyl polymerization catalyst for the styrene and (3) the product of reaction of a mixture of ingredients comprising (a) castor oil and (b) an organic diisocyanate.

6. A composition of matter comprising the product of reaction of a mixture of ingredients comprising (1) styrene, (2) a vinyl polymerization catalyst and (3) the product of reaction of a mixture of ingredients comprising (a) castor oil and (b) an organic diisocyanate.

7. A composition of matter comprising the product of reaction of a mixture of ingredients comprising (1) castor oil, (2) styrene, (3) an organic diisocyanate and (4) a vinyl polymerization catalyst for the styrene.

8. A composition of matter comprising (1) castor oil, (2) styrene and (3) toluene diisocyanate.

9. A composition of matter comprising (1) castor oil, (2) styrene and (3) hexamethylene diisocyanate.

10. A composition of matter comprising the product of reaction under heat of a mixture of ingredients comprising (1) castor oil, (2) styrene and (3) toluene diisocyanate.

11. A composition of matter comprising the product of reaction under heat of a mixture of ingredients comprising (1) castor oil, (2) styrene and (3) hexamethylene diisocyanate.

12. A composition of matter comprising (1) styrene and (2) the product of reaction of a mixture of ingredients comprising (a) castor oil and (b) hexamethylene diisocyanate.

13. A composition of matter comprising (1) styrene and (2) the product of reaction of a mixture of ingredients comprising (a) castor oil and (b) toluene diisocyanate.

14. A composition of matter comprising (1) styrene, (2) the product of reaction of a mixture of ingredients comprising castor oil and hexamethylene diisocyanate, (3) an organic diisocyanate and (4) a vinyl polymerization catalyst.

15. A composition of matter comprising (1) styrene, (2) the product of reaction of a mixture of ingredients comprising castor oil and toluene diisocyanate, (3) an organic diisocyanate and (4) a vinyl polymerization catalyst.

16. A composition of matter comprising the product of reaction under heat of a mixture of ingredients comprising (1) styrene, (2) the product of reaction of a mixture of ingredients comprising castor oil and hexamethylene diisocyanate, (3) an organic diisocyanate and (4) a vinyl polymerization catalyst.

17. A composition of matter comprising the product of reaction under heat of a mixture of ingredients comprising (1) styrene, (2) the produce of reaction of a mixture of ingredients comprising castor oil and toluene diisocyanate, (3) an organic diisocyanate and (4) a vinyl polymerization catalyst.

18. A composition of matter comprising the product of reaction of a mixture of ingredients comprising (1) styrene, (2) the product of reaction of a mixture of ingredients comprising castor oil and toluene diisocyanate, (3) benzoyl peroxide and (4) toluene diisocyanate.

19. A composition of matter comprising the product of reaction of a mixture of ingredients comprising (1) styrene, (2) the product of reaction of a mixture of ingredients comprising castor oil and hexamethylene diisocyanate, (3) benzoyl peroxide and (4) hexamethylene diisocyanate.

20. A composition of matter comprising, by weight, (1) from 10 to 75% styrene and (2) from 25 to 90% of a mixture of castor oil and an organic diisocyanate wherein the organic diisocyanate is present in the molar ratio of from 0.1 to 2 mols of the diisocyanate per mol of the castor oil.

21. A composition of matter comprising, by weight, (1) from 10 to 75% styrene and (2) from 25 to 90% of a product of reaction obtained by heating a mixture of ingredients comprising (a) castor oil and (b) an organic diisocyanate wherein the latter is present in the molar ratio of from 0.1 to 2 mols of the organic diisocyanate per mol of the castor oil.

22. A styrene-modified composition of matter selected from a class consisting of (A) a composition of matter comprising (1) castor oil, (2) styrene and (3) an organic diisocyanate and (B) a composition of matter comprising (1) styrene and (2) the product of reaction of a mixture of ingredients comprising (a) castor oil and (b) an organic diisocyanate.

23. The method which comprises (1) forming a mixture of ingredients comprising (a) castor oil and (b) an organic diisocyanate, (2) heating the said mixture and (3) adding styrene to the heated mixture to form a varnish.

24. The method which comprises (1) forming a mixture of ingredients comprising (a) styrene and (b) a reaction product of a mixture of ingredients comprising castor oil and an organic diisocyanate, (2) adding a vinyl polymerization catalyst and an organic diisocyanate to the said mixture and (3) heating the mixture obtained in (2) until a substantially insoluble, infusible product is obtained.

WILLIAM E. CASS.

REFERENCES CITED

The following references are of record in the file of this patent:

UNITED STATES PATENTS

| Number | Name | Date |
| --- | --- | --- |
| 2,358,475 | Pratt et al. | Sept. 19, 1944 |

OTHER REFERENCES

Schroeder et al.: Jour. Amer. Oil. Chem. Soc., April 1949, pp. 153–156.

Petit et al.: Official Digest, vol. 307, August 1950, pp. 609–614.